United States Patent [19]

Gaddis et al.

[11] Patent Number: 4,750,396
[45] Date of Patent: Jun. 14, 1988

[54] CUTTER TOOTH AND TOOL EMPLOYING IT

[75] Inventors: Paul G. Gaddis, Renton; David R. Ringlee, Gig Harbor, both of Wash.

[73] Assignee: Weyerhaeuser Company, Tacoma, Wash.

[21] Appl. No.: 936,556

[22] Filed: Dec. 1, 1986

[51] Int. Cl.⁴ ............................................. B27B 33/08
[52] U.S. Cl. ....................................... 83/847; 83/839; 83/840
[58] Field of Search ................ 83/842, 844, 838, 839, 83/840, 835

[56] References Cited

U.S. PATENT DOCUMENTS 4,563,929  1/1986  Ringlee et al. ........................ 83/840

FOREIGN PATENT DOCUMENTS 2743304  5/1979  Fed. Rep. of Germany ........ 83/844

Primary Examiner—Donald R. Schran
Attorney, Agent, or Firm—Keith D. Gehr

[57] ABSTRACT

The present invention is a rotary tool cutter tooth having a readily replaceable cutting portion and a tool employing the tooth. The tooth consists of an elongated shank for mounting the tooth on the tool body with a cutter element being bolted to the forward end of the shank. Preferably the back face of the cutter element is vertically grooved to receive the forward end of the shank so that the two are precisely aligned and any forces which tend to rotate the cutter element during use are resisted. The face of the shank that adjoins the cutter element may further be provided with a negative or inverted step which engages a corresponding step across the groove of the cutter element. These steps interlock to resist forces which would tend to translate the cutter element radially outward when in use. The cutter element may be made of a tool steel or other hard alloy, whereas the shank is typically formed from a mild steel.

20 Claims, 4 Drawing Sheets

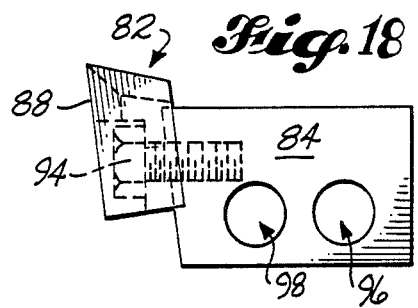
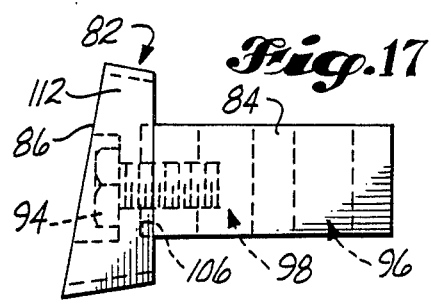
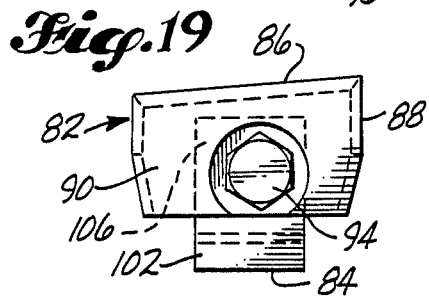
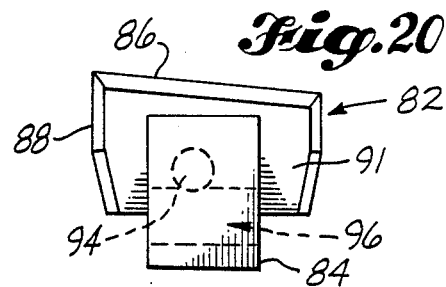
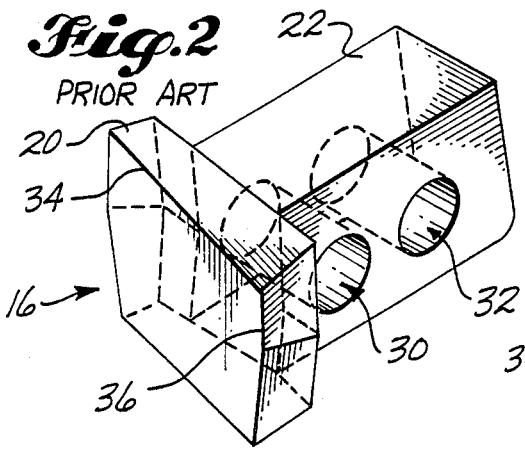
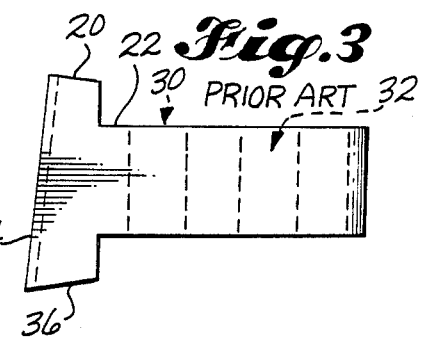
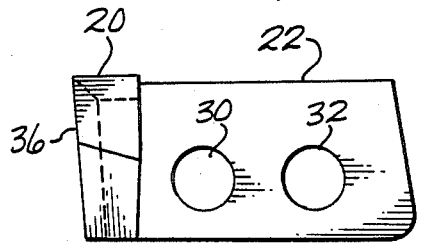
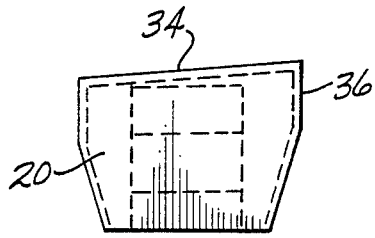
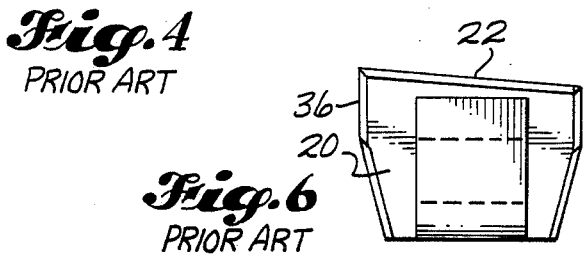

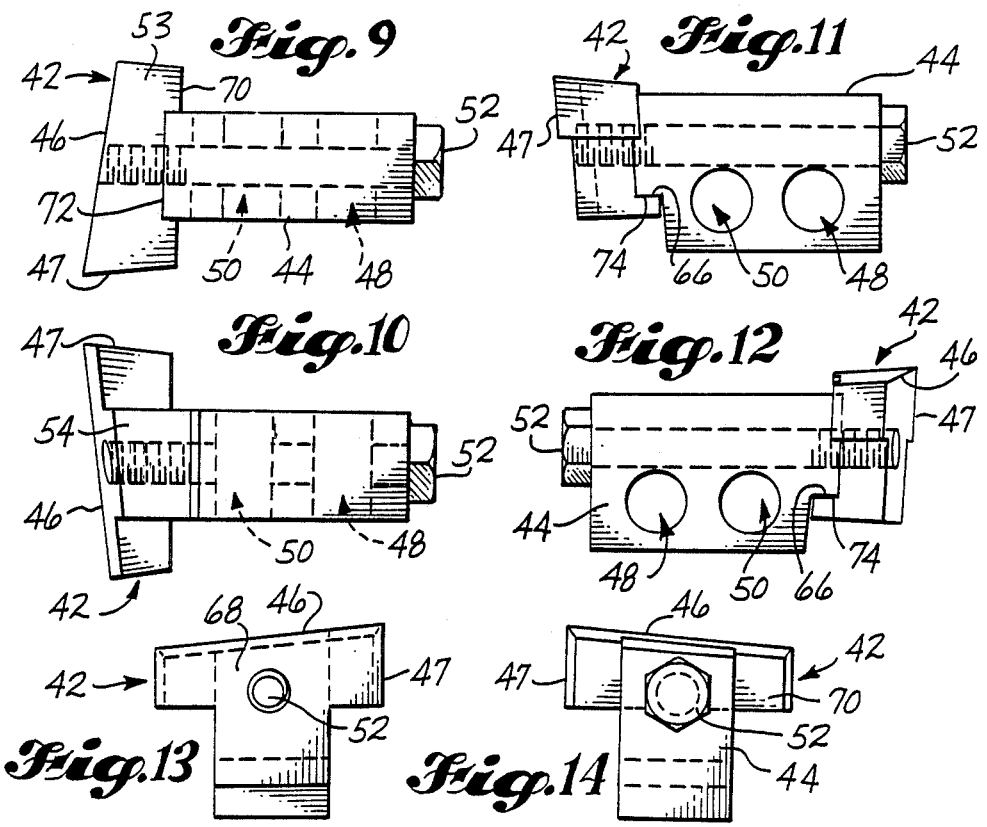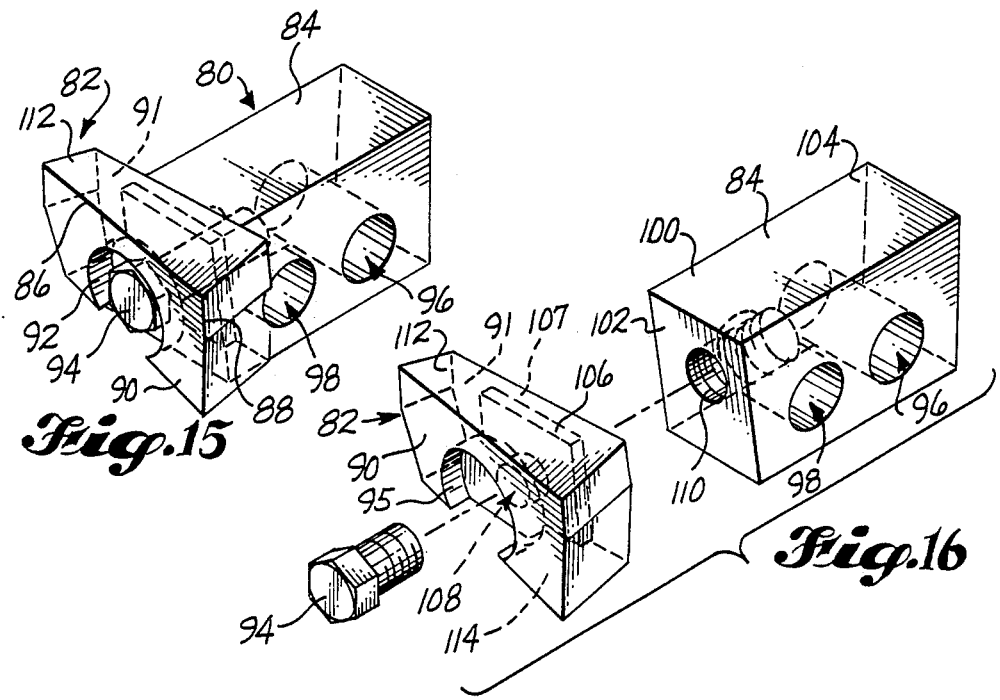

CUTTER TOOTH AND TOOL EMPLOYING IT

BACKGROUND OF THE INVENTION

The present invention relates to an easily replaceable cutter tooth for a circular saw, or any similar rotary machining tool, and to a tool employing the tooth. The tooth is particularly useful on very heavy duty saws used on whole tree harvesters.

In the past decade, automated felling and log bunching equipment has had a major increase in usage where the forest land is of moderate topography. The current popularity of this equipment is due in large part to the productivity gain and cost reduction compared with individual loggers using chain saws. Some of this equipment is capable of harvesting tree stems at rates up to 200 per hour when used under the most favorable conditions. Most mechanical felling equipment operates at much lower rates, however.

One of the popular types of mechanical harvesters in wide use today employs very heavy duty, hydraulically-operated shears to sever the tree from its stump. The use of these shears has resulted in a significant productivity gain, but this has not been without certain cost. Very often severe stresses are induced in the lower part of the tree trunk which later result in splits and/or checking when the tree is processed into lumber.

More recently, harvesters have become available using large, heavy duty circular saws to sever the trees. These have been quite successful in reducing stress damage in the butt portion of the log. However, the saw blades are quite expensive and their maximum life under field conditions has been far below expectations. Prior to the advent of the saw blade described in our earlier U.S. Pat. No. 4,563,929, blade life was generally less than 100 hours before destruction occurred due to accidental contact with a rock or similar object. In addition to the considerable expense of replacing a dull or destroyed blade, installation of a new blade in the field is not a simple matter because the blades are very heavy.

Before the availability of our above-noted saw blade, most of the circular saws available for whole tree felling were simply heavier-duty versions of conventional circular saw blades used in sawmills. These blades either have the teeth formed integrally around the circumference of the saw plate or teeth which can be individually inserted in locations provided around the periphery. In either case, the expensive saw plate itself is readily subject to damage and often is beyond repair when such damage has occurred. The saw described in our U.S. Pat. No. 4,563,929 is an extremely rugged circular saw which is readily field repairable if damaged during use. It comprises a flat, metallic saw plate of circular configuration. The saw plate has a plurality of flat segment members attached around the periphery along each side. Each of these segment members has a plurality of generally buttress-shaped or tooth-shaped, tooth retaining portions located on its outer edge. Segment members on each side of the plate are in an abutting end-to-end relationship. Those segment members on one side of the plate are in a staggered relationship with those on the other side of the plate so that the abutting end portions on one side are generally located opposite the central portions of the similar members on the opposite side. These segments are bolted into relatively softer metal bushings retained in apertures adjacent to periphery of the saw plate. Individual teeth are then bolted to the opposed buttress-shaped portions of the segment members. The saw is particularly strong because the design forms a continuous interconnected ring or hoop around the periphery. Cutting forces are spread throughout the ring and then transmitted to the saw disc. The interconnected hoop is a strong safety feature, since the loss of several bolts in the construction will not cause catastrophic failure of the saw.

We hereby wish to incorporate our earlier U.S. Pat. No. 4,563,929 by reference into the present application. This saw has had considerable acceptance in field use and has been generally very successful in overcoming the problems noted above for its previously available counterparts.

SUMMARY OF THE INVENTION

The present invention is a rotary tool cutter tooth having a cutting portion which can be readily and easily replaced in the field by unskilled labor using simple tools. The invention also encompasses saws or other types of rotary cutter tools employing teeth of the type described. The tooth is especially suitable for heavy whole tree cut-off saws but is more widely useable with other types of rotary cutting tools.

In the description that follows terms of reference are used as they relate to the figures in the drawings. For descriptions of the cutter teeth per se FIGS. 7 and 8 may be considered as exemplary. For a circular saw or similar tool employing the teeth FIG. 1 is exemplary. Thus, the "leading end" of a cutter tooth is that portion which first contacts the material being cut. An "upper" surface would be at the top of a cutter tooth; e.g., as indicated at 53 in FIG. 7. "Transverse" is used in its usual connotation meaning across or from side to side, as is shown by the direction of the inverted step 66 in FIG. 8. "Radially outward" would be toward the top of the sheet in reference to FIG. 1.

The cutter tooth has an elongated shank which serves to mount the tooth to a tool body and support the actual cutter element or head. At least a major portion of the shank is separate from the head. The shank has a trailing end and a leading end, the leading end having a face portion to engage a cutter head. The separate cutter head has a leading face portion and a shank-engaging trailing face portion as well as having upper and lower surfaces. The leading face portion will have at least one and normally two or three intersecting cutting edges. Additionally, some mechanism is necessary for preventing rotation of the head relative to the shank when the tool is subject to use stresses. This rotation prevention mechanism preferably comprises a dado-like slot formed in one of the engaging face portions of the shank or head, preferably the latter. The slot is sized and configured to snugly receive and embrace at least a part of the other engaging portion in order to align the head and shank and prevent relative rotation between them. In one version of the invention, elements mounted on the sawplate to hold the cutter teeth can also serve to prevent rotation between the shank and head and the slotted construction is not necessary. Finally, a fastening means, normally a longitudinal bolt or cap screw, joins the head and shank.

The rotation preventing slot can be oriented either transversely, from side to side, or between the upper and lower surfaces of the head or shank. Most preferably the slot is formed in a top-to-bottom direction along a line between the upper and lower surfaces of the head. The shank may have a leading end which is dimensionally narrower than its full width or thickness. However, it is preferable that the leading end be the full width of the shank so that the head engaging face portion and forward part of the leading end are embraced within the rotation prevention slot formed in the trailing face portion of the head.

In one configuration of the cutter tooth, the head engaging face portion of the shank and the corresponding surface of the slot in the head are planar in configuration. In another version, the lower portion of the leading end of the shank is formed into an inverted transverse or negative step. A corresponding or positive step is formed across the shank-engaging slot of the head. These steps interlock to resist forces which tend to translate the head radially outward from the tool when in use. The same planar or stepped versions may be used when a minor portion of the shank remains attached to the back or trailing face of the head and no slot is formed in either element.

The fastening means which attaches the head to the shank is typically a bolt or cap screw which is oriented through the shank and head along or generally parallel to the longitudinal axis of the shank. In one version of the invention the bolt head is inlet into a recess formed in the leading face portion of the head. In another version the bolt head bears against the trailing end of the shank and its threaded portion engages a corresponding threaded aperture in the head.

The invention is also considered to include a saw or other rotary tool having cutter teeth of the type just described.

A major advantage of a cutter tooth of this type is that when dulled or damaged due to operational use, the entire tooth need not be removed from the saw. Usually a simple replacement of the head is all that is necessary and this can be done by loosening the single fastening bolt with a conventional wrench.

Another important advantage of the present invention is that the head and shank of the tooth can be formed from metallurgically different alloys. These can be chosen to have optimum properties for their particular requirements. Whereas cemented carbide inserts along the cutting edges were often needed before, less expensive and more rugged steel alloys can now often be used for the entire head.

It is an object of the present invention to provide a rotary tool cutter tooth having a readily replaceable cutting portion.

It is another object of the invention to provide a cutter tooth having a separate edged cutter element or head which can be easily replaced in the field.

It is a further object to provide a cutter tooth in which the mounting shank and cutter element may be advantageously made of alloys having differing properties.

It is yet another object to provide a saw or similar rotary cutting tool that advantageously employs the cutter teeth of the invention.

These and many other objects will become readily apparent to those skilled in the art upon reading the following detailed description taken in conjunction with the attached drawings.

BRIEF DESCRIPTION OF THE DRAWINGS

FIGS. 2 through 6 show various views of the tooth originally used with the above saw with these figures respectively showing perspective, top plan, and left, front, and rear elevations.

FIGS. 7 through 14 show one version of the present tooth in which the figures show respectively perspective and exploded perspective views, top and bottom plan views, and left side, right side, front, and rear elevations.

FIGS. 15 through 20 show another version of the tooth of the present invention in which the figures show respectively perspective and exploded perspective views, a top plan view, and left side, front, and rear elevations.

DESCRIPTION OF THE PREFERRED EMBODIMENTS

As has been noted previously, the cutter teeth of the present invention are useable on many types of rotary cutting tools. Without any intention of being so limiting, for simplicity of description the present cutter teeth will be described in conjunction with a saw which could typically be a whole tree cutoff saw.

Figure 1:
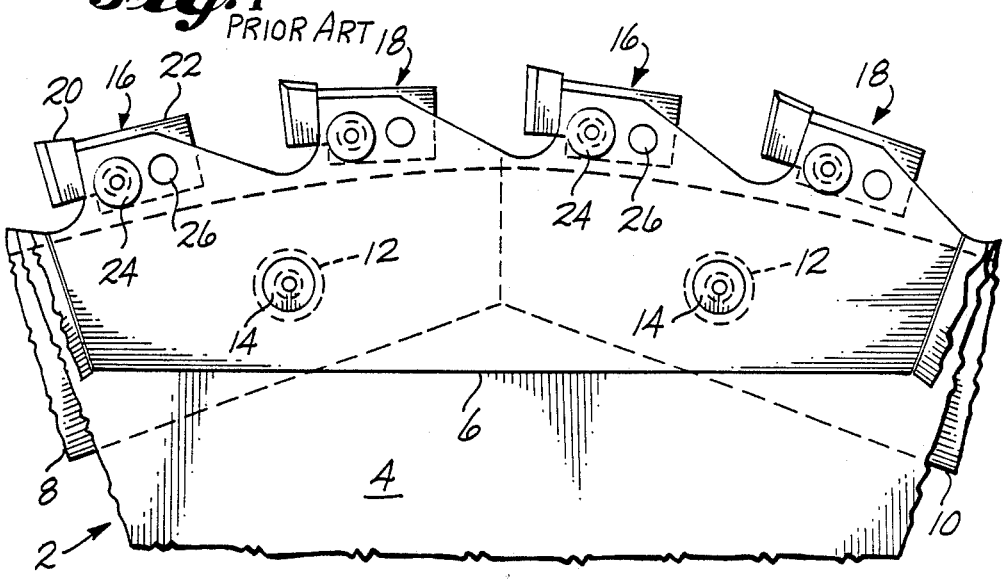
FIG. 1 is a fragmentary side elevation of a field repairable saw of the type described in U.S. Pat. No. 4,563,929.
Figure 7:
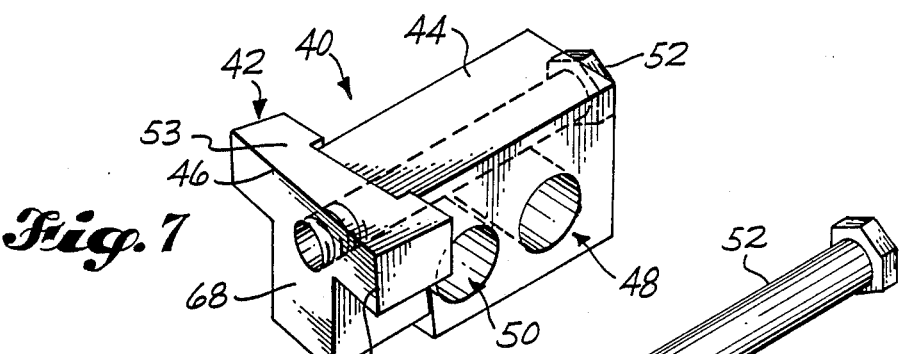
Figure 8:
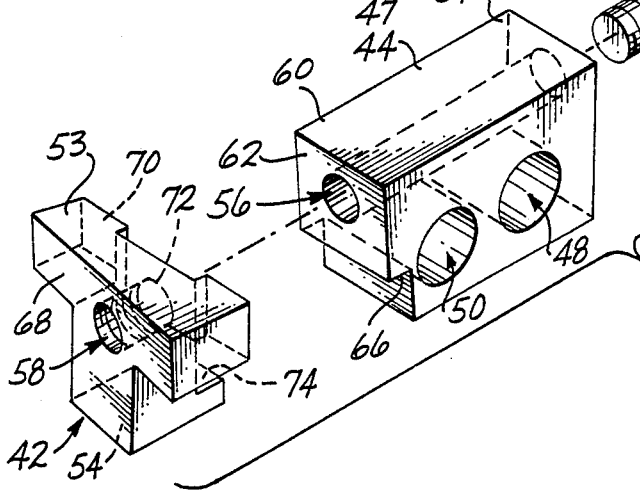

Referring now to the drawings, FIG. 1 shows a fragmentary view of a marginal portion of a prior art whole tree cutoff saw 2. This consists of a disc or saw plate 4, a front peripheral segment plate 6 and rear peripheral segment plates 8, 10. A threaded metal bushing 12, generally of metal somewhat softer than the saw plate, is inserted into corresponding equiangularly-spaced apertures located near the periphery of the saw plate. Stubby countersunk cap screws 14, inserted from both front and rear, attach the peripheral segments to the saw plate. A plurality of replaceable teeth are held between the peripheral segments. Those teeth generally indicated at 16 are left side cutting teeth and those indicated at 18 are right side cutting teeth. These teeth are unitary and consist of a head portion 20 and shank portion 22. The teeth are held between the buttressed areas of the peripheral segment plates by flush headed cap screws 24, which enter from the front side of the assembly, and 26, which enter from the back side of the saw blade.

FIGS. 2 to 6 are detailed views of a prior art tooth. The shank is drilled transversely with mounting apertures 30, 32 which pass cap screws 24, 26. The head portion 20 has a transverse cutting edge 34 and an intersecting cutting edge 36. In order to replace a tooth of this type, both of the cap screws 24, 26 must be removed. It is also necessary for the entire tooth to be made of a relatively hard alloy and/or to have expensive and brittle carbide inserts along the cutting edges.

FIGS. 7 to 14 show one version of a tooth, generally indicated at 40, made according to the present invention. The tooth represented is a left side cutter. A right side cutter would be formed as a mirror image of the one shown. This tooth has a head or cutter element portion 42 and a shank portion 44. The head has a transverse cutting edge 46 and an intersecting cutting edge 47. Shank 44 has conventionally placed, transversely formed mounting apertures 48, 50. A bolt or cap screw 52 unites the shank and head.

In the example just described, the head has an upper surface 53 and a lower surface 54. Further, it has a leading face portion 68 and a trailing face portion 70. A vertical groove 72 is formed within the trailing face portion of the cutter head. This is terminated at the bottom by a positive step or shoulder 74.

Shank 44 has a longitudinal bolt aperture 56 while the head 42 has a corresponding threaded aperture 58 to receive the threaded end of bolt 52. The shank has a leading end 60 with a leading face portion 62 and a trailing end 64. Machined or otherwise formed into the leading face portion is a negative or inverted transverse step or shoulder 66 which engages corresponding step 74 on the head when the two are assembled.

FIGS. 15 to 20 show an alternative version 80 of the tooth of the present invention. This consists of a head or cutter element portion 82 and a shank portion 84. The cutter element has a transverse cutting edge 86 and an intersecting cutting edge 88. The cutter element further has a leading face 90 and a trailing face 91 as well as an upper surface 112 and a lower surface 114. A bolt or cap screw 94 unites the cutter element and shank portion. The head of the bolt is contained within a recess or cavity 95 in the leading face of the head.

Shank portion 84 has two transversely placed mounting apertures 96, 98. The shank further has a leading end 100, having a face portion 102, and a trailing end 104. A slot or groove 106 is inlet into the trailing face 91 of the head. This slot is shown closed at the upper end by a bridged portion 107. This presents a cleaner face 112 on the upper surface of the element but is not essential to the operation of the tool. An aperture 108 is formed through the head and a corresponding threaded aperture 110 is provided in the leading end of the shank 84 to accept bolt or cap screw 94.

Figure 21:
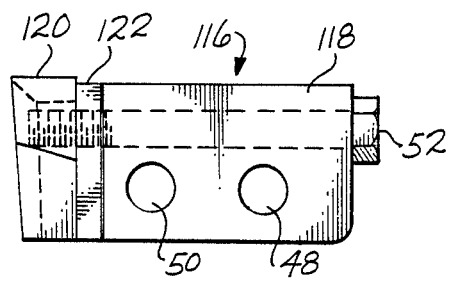
FIGS. 21 and 22 show left side elevations of yet another version of the cutter tooth.
Figure 22:
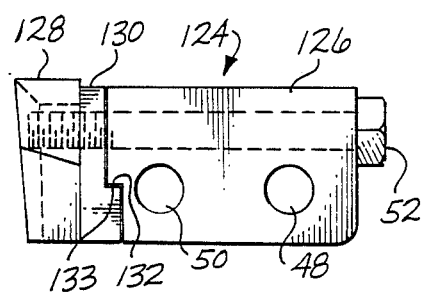
Figure 23:
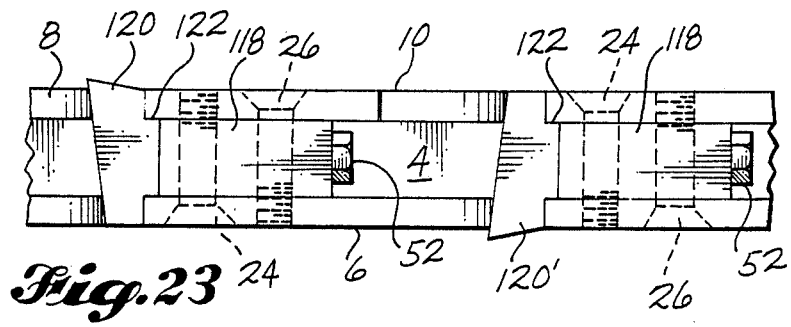
FIG. 23 is a fragmentary edge view of a saw similar to that shown in FIG. 1, and employing teeth as shown in FIGS. 21 or 22.

A simpler version of the cutter tooth is shown in FIGS. 21-23. The embodiment 116 of FIG. 21 has a shank 118 and head 120. A small portion 122 of the shank is made integral with the head. These are united, as described before, by a bolt 52. In the embodiment 124 shown in FIG. 22 the shank portion 126 has an inverted step or shoulder 132 formed in its leading face. Head 128 has an integral short or minor portion of the shank 130 having in its trailing face a corresponding step 133 which bears against shoulder 132 to resist radial translation from use stresses.

The above teeth have no means of rotation prevention other than the step in the version of FIG. 22. This is achieved when the teeth are mounted in a saw, as shown in FIG. 23. Peripheral segment plates 6, 8 and 10 tightly embrace both the major portion of the shank 118 and the minor portion 122 to effectively prevent rotation of the head relative to the shank.

In its most convenient form the head of the present invention is made of an alloy steel, such as A.I.S.I. D-2 tool steel, O6 tool steel or Stellite. Stellite is a registered trademark of Cabot Corporation, Cabot Stellite Division, Kokomo, Ind., for a series of hard, high cobalt alloys. The head portion is preferably formed by a precision molding process such as investment casting or shell molding while the shank portion of the cutter tooth is usually more economically manufactured by machining from bar stock using a somewhat softer but tougher steel, such as A.I.S.I. C-1018.

It will be apparent to those skilled in the art that many variations can be made in the cutter tooth which may not have been shown in the drawings or described herein. It is the intention of the inventors that these variations should be included within the scope of the invention if they are encompassed within the following claims.

We claim:

1. A rotary cutter tooth having a readily replaceable cutting portion which comprises:

a head means having at least one cutting edge, an elongated shank means for mounting the cutter tooth on a tool body, and a fastening means for rigidly uniting the head means to the leading end of the shank means; and translation prevention means for resisting forces tending to translate the head means radially outward when in use, said translation prevention means comprising an inverted transverse step formed in the leading end of the shank means and a corresponding transverse step formed in the adjoining portion of the cutter element, said steps being in an engaging and interlocking relationship, wherein at least a major portion of the shank means is separate from the head means and the fastening means is a bolt oriented through the head and shank generally parallel to the longitudinal axis of the shank means.

2. The rotary tool cutter tooth of claim 1 in which a minor portion of the shank is integral with the head means and said corresponding transverse step is formed in said minor portion.

3. The rotary tool cutter tooth of claim 1 which has aligning and rotation prevention means to index the head means in a predetermined position on the shank means and resist forces tending to rotate the head means relative to the shank means.

4. The rotary tool cutter tooth of claim 3 in which the rotation prevention means comprises a dado-like slot formed in either the head or shank means to snugly receive and embrace a portion of the other means.

5. The rotary tool cutter tooth of claim 4 in which the slot is inlet into the head means for receiving a portion of the shank means.

6. The rotary tool cutter tooth of claim 5 in which the slot is oriented along a line drawn between upper and lower surfaces of the head means.

7. The rotary tool cutter tooth of claim 6 in which the entire portion of the shank means engaging the bottom of the slot in the head means is essentially planar.

8. The rotary tool cutter tooth of claim 6 in which the portion of the shank means engaging the bottom of the slot in the head means is formed into an inverted transverse step and a corresponding transverse step is formed across the bottom of the slot in the head means, said steps interlocking to resist forces tending to translate the cutter element radially outward when in use.

9. The rotary tool cutter tooth of claim 1 in which the fastening bolt has a head inlet into a recess in the tooth head means, said bolt being threaded into the shank means.

10. The rotary tool cutter tooth of claim 1 in which the fastening bolt has a head bearing against the trailing end of the shank means, said bolt being threaded into the head means.

11. In a saw having a flat metallic sawplate of generally circular configuration, replaceable cutter teeth located around the periphery of the sawplate, and opposed flat tooth retaining segment members attached around and extending beyond the periphery of each face of the sawplate, the improvement which comprises:

cutter teeth having a readily replaceable head means with at least one cutting edge, an elongated shank means for mounting the cutter tooth on the saw-plate, and a fastening means for rigidly uniting the head means to the leading end of the shank means; and translation prevention means for resisting forces tending to translate the head means radially outward when in use, said translation prevention means comprising an inverted transverse step formed in the leading end of the shank means and a corresponding transverse step formed in the adjoining portion of the cutter element, said steps being in an engaging and interlocking relationship, wherein at least a major portion of the shank means is separate from the head means and the fastening means is a bolt oriented through the head and shank generally parallel to the longitudinal axis of the shank means.

12. The saw of claim 11 in which the cutter teeth have a minor portion of the shank integral with the head means and said corresponding transverse step is formed in said minor portion.

13. The saw of claim 11 in which the junction of the minor and major portions of the tooth shank is located between the tooth retaining segmented members and said segmented members act against said major and minor portions to prevent rotation of the head means relative to the shank means.

14. The saw of claim 11 in which the cutter teeth have a minor portion of the shank integral with the head means and the junction of the minor and major portions of the shank is located between the tooth retaining segmented members, said segmented members acting against said major and minor portions to prevent rotation of the head means relative to the shank means.

15. The saw of claim 11 in which the cutter teeth have aligning and rotation prevention means to index the head means in a predetermined position on the shank means and resist any forces tending to rotate the head means relative to the shank means.

16. The saw of claim 15 in which the rotation prevention means of the cutter teeth comprises a dado-like slot formed in either the head or shank means to snugly receive and embrace a portion of the other means.

17. The saw of claim 15 in which the tooth head means has an inlet slot for receiving a portion of the shank means.

18. The saw of claim 17 in which the slot in the tooth head is oriented essentially along a line describing a radius of the saw.

19. The saw of claim 11 in which the fastening bolt has a head inlet into a recess in the tooth head means, said bolt being threaded into the shank means.

20. The saw of claim 11 in which the tooth fastening bolt has a head bearing against the trailing end of the shank means, said bolt being threaded in the head means.

* * * * *